Patented Aug. 23, 1949

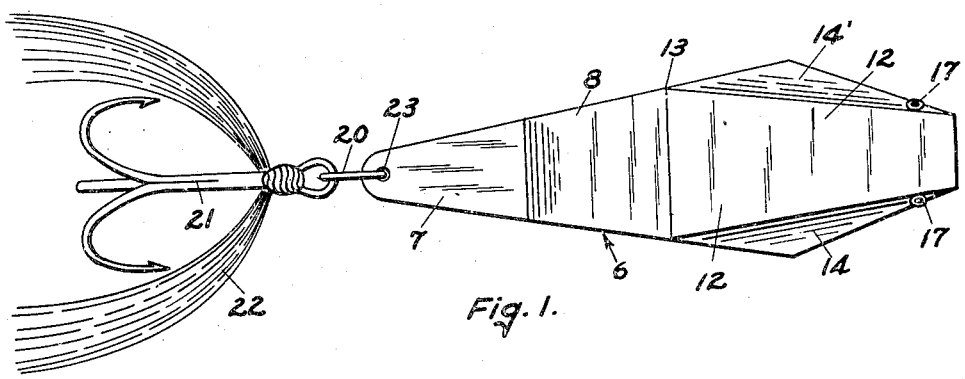
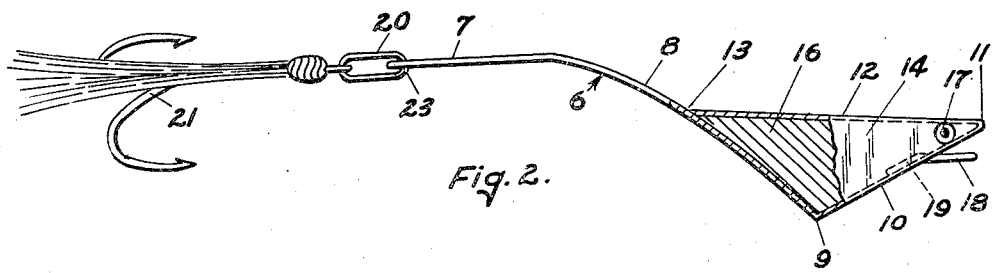
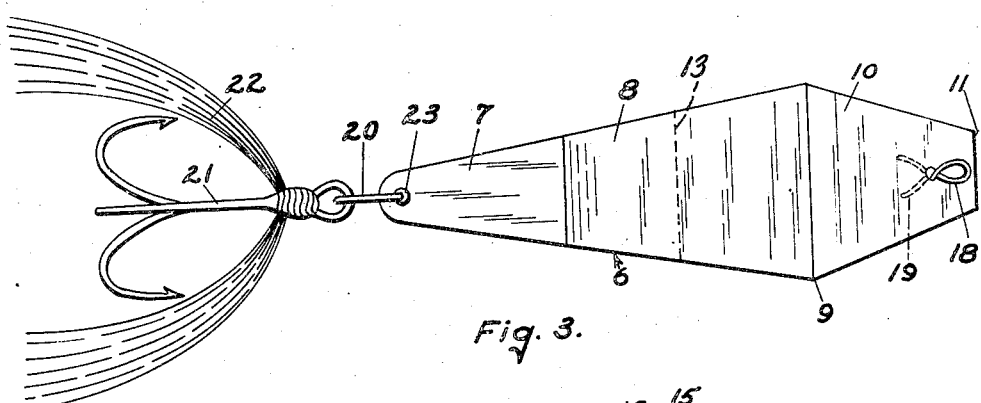
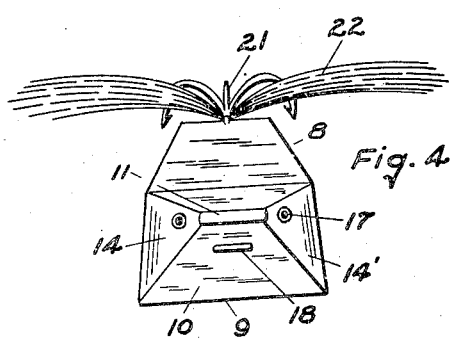
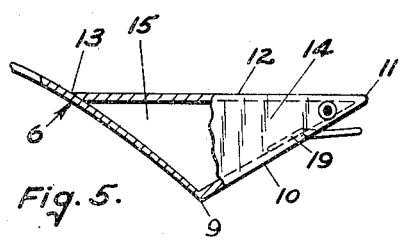
INVENTOR:
THOMAS A. FINDLAY

2,479,675

UNITED STATES PATENT OFFICE 2,479,675

FISH BAIT

Thomas A. Findlay, Minocqua, Wis.

Application July 19, 1946, Serial No. 684,946

3 Claims. (Cl. 43—42.35)

The present invention relates to an improved artificial fish bait.

One of the objects of the present invention is to provide an easily manipulated artificial fish bait which might be generally designated as being of the "plug" type primarily intended for either casting or trolling, and is particularly effective for catching bass, muskellunge, pike and the like.

The bait can be made either to be of the surface or of the deeper going types, depending upon the material of which it is made, all as will be more fully hereinafter explained.

It is a further object of the invention to provide a casting or trolling plug which is characterized by a rather peculiar and very effective weaving motion, either when cast and retrieved or when trolled. By reason of its shape it will alternately rise to the surface and dive and then come back to the surface, also occasionally making sideward darting movements which are highly attractive to game fish.

The invention is illustrated in a sheet of drawings in which:

Fig. 1 is a top plan view of the bait of the present invention;

Fig. 2 is a side elevational view partially in section;

Fig. 3 is a bottom plan view;

Fig. 4 is a frontal elevation, and

Fig. 5 is a partial side elevation, also shown partially in section.

The bait comprises a relatively thin elongated plate-like body member, broadly designated by the reference numeral 6, and which consists of a substantially horizontally disposed flat posterior portion 7, and a downwardly curved portion 8, this portion having an obtuse or right angle along the line 9 (see Fig. 3), whereafter it is again upwardly directed at the forward portion 10, then being bent backwardly at a sharp acute angle along the line 11, forming an upper anterior portion 12 which substantially meets and may be attached to the curved portion 8 along the line 13.

As can best be seen from Fig. 2, a longitudinal cross section of the forward or anterior portion of the bait is substantially triangular, forming a space bounded respectively by the parts 8, 10 and 12. Side portions 14 and 14' are welded, brazed, soldered or otherwise secured to the portions 8, 10 and 12, so as to define a space 15 which is bounded by the parts 8, 10 and 12, and the two side walls 14 and 14'. As shown in Fig. 5, the space 15 may be entirely empty, or as shown in Fig. 2, it may contain a filling material 16, which may be either lighter or heavier than water, depending upon the action desired in the bait.

Simulations of fish eyes 17 are located on each side of the device so that the entire portion thereof will simulate the appearance of the head of a fish or similar animal.

A suitable tying loop 18 is provided along the section 10, preferably penetrating the same, and being suitably secured by means of the lugs 19 on the reverse side of the portion 10. This loop is for the attachment of a suitable fishing line.

Attached to the end of the flat posterior section 7, by means of, for example, a link 20, is a triple fish hook 21, which may have associated therewith a buck tail 22 to serve as an additional means for attracting the fish. However, any other natural food-imitating device may be substituted for the buck tail, and particularly for smaller fish, suitable imitations of flies, small crustaceans, and the like, may be substituted.

Assuming for purposes of example that the bait be made of thin sheet metal, it will be self evident that it will inherently be heavier than water, and would sink at once when thrown upon the surface of a lake or stream. However, upon retrieving the bait or by propelling through the water by trolling it, it will tend to rise to the surface by reason of the inclination of the surface 10 until it reaches the surface where it will tend to dive and change its position, and will then course downwardly until, due to the inclination of the portion 8, it will gradually be brought to the horizontal position, whereupon it will again tend to come to the surface; in other words, it will weave up and down in the water. Self evidently the position of the fish hook 21 which is being towed along, will vary in the same manner. The bait therefore will attract such fish as bass, which tend to attack a material near the surface, and will also attract fish which strike at lower levels, such as muskellunge, pike, and the like. The degree of diving and surfacing can be controlled to considerable extent by the relative weight of the head portion and the tail portion of the device. If a device is desired which will have a stronger tendency to surface, then the space 15 may be left empty as shown by Fig. 5, or may be filled with a light material such as wood or cork as shown at 16 in Fig. 2. If, however, it is desired to have the bait go considerably below the surface, the space may be filled with heavier material such as a suitable plastic or metal which occupies the space 15, as shown at 16 in Fig. 2. Also, if the plate material 7, 8, 10 and 12 be made of a suitable non-metallic substance, such as wood or a plastic which is lighter than water, the solid filling material 16 may have such a density as will give the entire bait the desired balance.

The exact manner of attaching the fish hook is of course a matter of considerable choice, and if desired additional hooks may be attached, either to the posterior piece, or to the downwardly bent piece 8, in accordance with well established practice.

The bait is shown in the figures substantially of the size actually used but obviously can be made larger or smaller, depending upon the type of fish it is desired to attract.

The method of attaching the portion 12 to the portion 8 is also a matter of indifference and it may be done by either welding, soldering, gluing or cementing. Likewise, the method of attaching the fish hook 22 by means of the link 20 which passes through the hole 23 in the posterior section 7 of the bait is subjected to a considerable variation well within the mechanical skill of casting and trolling bait manufacturers.

The bait has been found particularly effective if trolled at reasonable speeds, and if cast and retrieved with a fairly steady reeling of the line, the weaving effect being inherent in the construction of the device. By reason of the somewhat flaring side walls 14—14' there is also a tendency for a certain amount of lateral or darting movement which further enhances the attractiveness of the bait for game fish.

Accordingly, applicant claims:

1. A fish bait comprising a relatively thin plate-like body member having a substantially straight horizontal posterior portion, a downwardly inclined portion, a thereto contiguous upwardly inclined portion and a substantially horizontal forward portion terminating at about the middle of the downwardly inclined portion; said last-mentioned two portions forming a head-simulating anterior portion; and a fish-hook secured to the free end of the posterior portion.

2. A fish bait comprising a relatively thin plate-like body member having a substantially straight horizontal posterior portion, a downwardly inclined portion, a thereto contiguous upwardly inclined portion and a substantially horizontal forward portion terminating at about the middle of the downwardly inclined portion; two opposed plates secured to the opposite edges of said portions to enclose a space bounded by said plates and the downwardly inclined, upwardly inclined and forward portions, thereby forming a head-simulating anterior portion of the bait; and a fish-hook secured to the free end of the posterior portion.

3. A fish bait comprising a relatively thin plate having a substantially straight posterior part merging into a continuous forwardly extending portion bent downwardly and then abruptly upwardly at an obtuse angle, and another continuous portion bent back upon itself on a sharply acute angle and terminating at the downwardly bent portion; the space defined by said portions being filled with a solid material, thereby forming with said portions a head-simulating anterior member of the bait; and a fishhook attached to the free end of said straight posterior part.

THOMAS A. FINDLAY.

REFERENCES CITED

The following references are of record in the file of this patent:

UNITED STATES PATENTS

| Number | Name | Date |
| --- | --- | --- |
| 841,429 | Passage | Jan. 15, 1907 |
| 1,683,890 | Heitmiller | Sept. 11, 1928 |
| 1,836,650 | Davenport | Dec. 15, 1931 |
| 1,883,695 | Goerke | Oct. 18, 1932 |
| 2,218,259 | Finucan | Oct. 15, 1940 |
| 2,246,413 | Haselwood | June 17, 1941 |